T. BRENNAN, Jr.
DISK FURROW OPENER.
APPLICATION FILED FEB. 8, 1910.
977,367.
Patented Nov. 29, 1910.
2 SHEETS—SHEET 1.
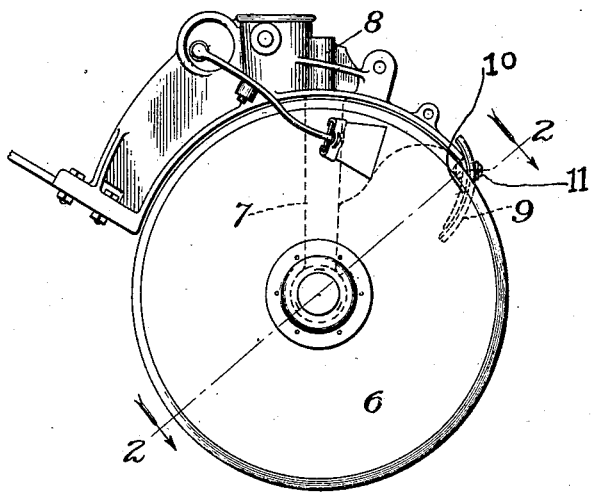
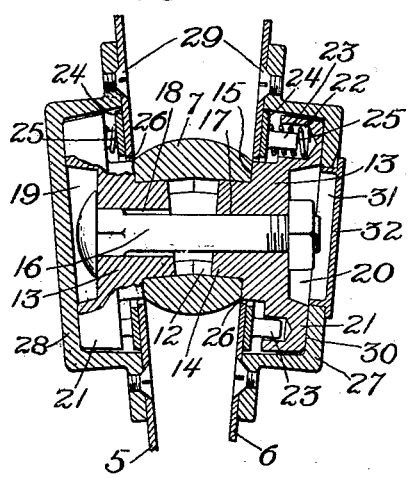
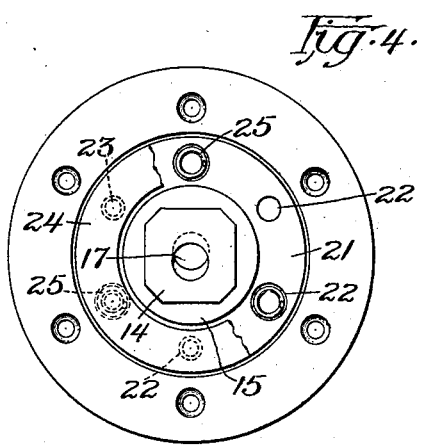
Witnesses:
J. M. Daggett.
Thos. A. Banning Jr.
Inventor
Thomas Brennan, Jr.
by Banning & Banning
Attys.

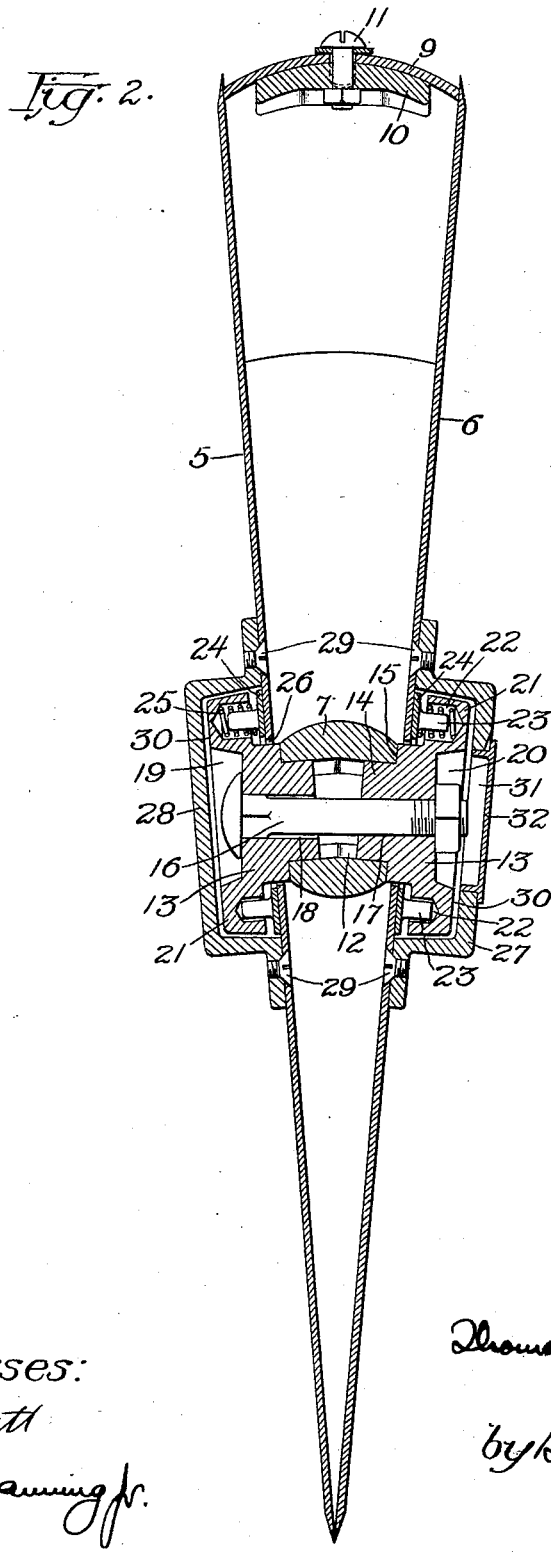

UNITED STATES PATENT OFFICE.

THOMAS BRENNAN, JR., OF ST. LOUIS PARK, MINNESOTA, ASSIGNOR TO MONITOR DRILL COMPANY, OF ST. LOUIS PARK, MINNESOTA, A CORPORATION OF MINNESOTA.

DISK FURROW-OPENER.

977,367.   Specification of Letters Patent.   Patented Nov. 29, 1910.

Application filed February 8, 1910. Serial No. 542,699.

*To all whom it may concern:*

Be it known that I, THOMAS BRENNAN, Jr., a citizen of the United States, residing at St. Louis Park, Hennepin county, Minnesota, have invented certain new and useful Improvements in Disk Furrow-Openers, of which the following is a specification.

This invention relates to that type of disk furrow opener in which two plowing disks carried by a common shank are so placed that their working edges will always be in working contact with a suitable pressure in a location near the point where the furrow is to be opened and has for its object to provide novel and efficient means for maintaining the edges of said disks in flexible working contact during the working life of the disks, at the proper point. Also to provide a construction which shall be so simple that it can be cheaply made and so that it shall require little if any attention when in use for long periods; one in which the angle between the disks may remain practically the same when the disks have worn down to their minimum practical diameter as it was when they were new, thereby insuring that the furrow opener shall work with practically the same ease and in practically the same manner when old as when new; one in which the disks shall be supported with sufficient flexibility so that they will yield a proper amount when encountering stones or other hard objects so as not to throw undue burdens on the supporting structure and on the disks themselves due to sudden strains imposed thereby; and one which shall not require, for its proper working that the parts be machined and made with considerable accuracy.

Other objects will appear from a detailed description of the invention which consists in the features of construction and combination of parts hereinafter described and claimed.

In the drawings, Figure 1, shows a side elevation of a disk furrow opener embodying my invention; Fig. 2 shows a detailed section taken along the line 2—2 of Fig. 1, looking in the direction of the arrows and showing the manner in which the springs act to maintain new and large disks in contact with each other near the point where they act to open the furrow; Fig. 3 shows a detailed section through the hub portions of the disks, showing the manner in which the springs hold the disks close together when they have worn down to their minimum practical diameter; and Fig. 4 is a detail elevation looking at the inner side of the hub portion showing also a portion of the contacting ring cut away to reveal the springs which set within the recesses beneath.

In the figures disks 5 and 6 are adapted to be supported on a shank 7 at a suitable angle with each other in such a way that they shall always be flexibly held in contact in one portion and so that the point of contact shall be near the point where the furrow is to be opened. The shank 7 is suitably attached to a supporting member 8, adapted to be carried in any desired manner by the frame of the plow.

In this application I do not concern myself with the driving mechanism to which the member 8 is attached.

The furrow opener may be provided near its rear portion with an inside scraper 9, which may be of any suitable form but is preferably one which can be adjusted from time to time or one which will be self-adjusting so that it will maintain the inner faces of the disks clear of dirt or mud. In its preferred form it is attached to a fixed portion 10, which is connected with or forms a part of the driving member 8, and has in its face a longitudinal slot which receives a screw 11. The scraper may be made of wedge formation so that it will properly engage the inner faces of the disks. However I do not limit myself to the use of a scraper of the type shown nor is the use of such a scraper necessary to the proper working of my improved furrow opener.

The shank 7 may be provided with recesses or holes 12 of any suitable shape for preventing rotation of hubs 13 when attached to the shank. In their preferred form the hubs 13 are provided with locking portions 14 of approximately octagonal formation, and the holes 12 are adapted to receive the locking portions 14. Each hub is provided with a shoulder 15 for contacting the shank so that when the hubs are attached to the shank they will be held rigidly thereto. For this securing means I prefer to use a bolt 16 passing through holes 17 and 18 in the hubs and the shank, and having its head and nut set within recesses 19 and 20 formed in the hubs. Each hub is preferably provided with an annular ring portion 21 having on its inner face a series of recesses 22. Every second recess may be adapted to receive a lug 23 of a contacting ring 24 and a helical spring 25 surrounding the lug while the other holes are of a size to receive the lugs 23 alone. The contacting rings 24 surround the hub portions 13 and are adapted to lie flush against the faces of the disks 5 and 6. The disks are provided with holes 26 of a size to allow them to move freely about the hub portions and shank, not only parallel to themselves but also with a rocking motion. Caps 27 and 28 are rigidly attached to the disks by means of rivets or screws 29. Each cap is of a size and shape such that when the disks are allowed to be forced inward toward each other to the maximum degree by the springs 25 the caps will come in contact with the outer faces 30 of the hubs and will be arrested thereby and the inward movements of the disks may be thereby fixed and limited. The cap 27 on the side adjacent to the nut of the bolt is preferably provided with a hole 31 for allowing access to the nut, and a cover 32 is adapted to close the said hole, and the cover may be of simple design and held in place by friction.

It is seen that my invention provides simple and effective means for holding the disks in firm but flexible contact with each other at the proper point, and that as the disks wear down in diameter the springs will always tend to keep the disks in contact near the point where they open the furrow. It is also seen that the disks may rotate about the hubs and that in so doing their edges will always be maintained in flexible contact in approximately the same position relative to the shank and other fixed members, such rotation insuring that the disks shall work easily and wear uniformly around their entire peripheries.

It is furthermore seen that if desired, the disks may be caused to maintain a constant angle with each other by readjustment of the rear inner scraper from time to time, and that consequently they will turn a furrow with the same ease and in the same manner when old as when they were new. However, it is not necessary that the disks be caused to maintain a constant angle with each other by bringing the rear scraper into sufficient pressure with them to accomplish this end, as such pressure might be unduly large.

The construction is a simple one which may be manufactured at low cost. The wearing parts are well inclosed so that dirt may be kept out from them, but the arrangement is such that the disks can be removed and the hubs disassembled with comparative ease. Evidently the use of helical springs such as those shown can be dispensed with and any suitable form of spring or other compressing or tension means be used which will force the disks toward each other near their central portions. A spring washer would be in the nature of a such a compressing device. It will be seen that the use of means for maintaining the disks in flexible contact near the point where the furrow is to be opened, makes unnecessary the accurate machining of the disks in the manufacturing process; and that likewise, it is not necessary that the castings and machine work for the shank and hub construction be accurately performed. Therefore this flexible means of supporting the disks will effect a very considerable reduction in the cost of manufacturing furrow openers embodying my invention, without in any way detracting from the satisfactory operation of double disk furrow openers.

I claim:

1. In a furrow opener the combination of two disks, flexible means exerting an inward pressure on the centers of the disks for maintaining the edges of the disks in flexible contact, substantially as described.

2. In a furrow opener the combination of two disks, flexible means exerting an inward pressure on the centers of the disks for maintaining the edges of the disks in flexible contact near the point where the furrow is to be opened, substantially as described.

3. In a furrow opener the combination of two disks, flexible means exerting an inward pressure on the centers of the disks, the disks being supported at an angle so that they will come into contact on their edges, substantially as described.

4. In a furrow opener the combination of two disks, flexible means exerting an inward pressure on the centers of the disks, the disks being flexibly supported by a shank at a suitable angle so that their edges will be brought into contact near the point where the furrow is to be opened, substantially as described.

5. In a furrow opener the combination of two disks, flexible means tending to bring the disks toward each other near their central portion, the disks being supported at an angle so that they will come into contact on their edges, substantially as described.

6. In a furrow opener the combination of two disks, flexible means tending to bring the disks toward each other near their central portion, the disks being supported at an angle so that they will come into contact on their edges, near the point where the furrow is to be opened, substantially as described.

7. In a furrow opener the combination of a shank, two disks, one on each side of the shank, and flexible compressing means acting on the central portions of the disks, tending to force them toward each other, substantially as described.

8. In a furrow opener the combination of a shank, a disk on each side of the shank, and flexible compressing means acting on the central portions of the disks tending to force them toward each other, the disks being supported at an angle with each other, substantially as described.

9. In a furrow opener the combination of a shank, a disk on each side of the shank, the disks being supported at an angle with each other, and flexible compressing means acting on the central portions of the disks tending to force them toward each other so that they will come into contact near the point where the furrow is to be opened, substantially as described.

10. In a furrow opener the combination of a shank, hubs rigidly secured to the shank at an angle with each other, each hub provided with an annular ring portion, a disk on each side of the shank and provided with a hole in its central portion for encircling a portion of the hub on that side of the shank, and springs acting on the annular ring portion of the hub and outer face of the disk on that side of the shank for forcing the disks toward each other, substantially as described.

11. In a furrow opener the combination of a shank, hubs rigidly secured to the shank at an angle with each other, each hub provided with an annular ring portion, a disk on each side of the shank provided near its central portion with a hole for encircling a portion of the hub; recesses formed in the inner faces of the annular ring portion of the hub, a contacting ring surrounding a portion of the hub between the disk and the annular ring portion of the hub, and springs set within the recesses on the inner faces of the annular ring portion and acting to force the disks toward each other, substantially as described.

12. In a furrow opener the combination of a shank, hubs rigidly secured to the shank at an angle with each other, each hub provided with an annular ring portion, a disk on each side of the shank provided near its central portion with a hole for encircling a portion of the hub; recesses formed in the inner faces of the annular ring portions of the hub, a contacting ring surrounding a portion of the hub between the disks and the annular ring portion of the hub, springs set within the recesses on the inner faces of the annular ring portions and acting against the contacting rings to force the disks toward each other, and a cap secured to the outer face of each disk and covering the hub portion on that side of the shank and adapted to limit the inward motion of the disk, substantially as described.

THOMAS BRENNAN, Jr.

Witnesses:
E. R. BEEMAN,
LOUIS W. FULLER.